United States Patent Office 3,345,135
Patented Oct. 3, 1967

3,345,135
THE CATALYTIC OXIDATION OF HYDROCARBONS IN THE PRESENCE OF HYDROGEN SULFIDE TO PRODUCE CARBON DISULFIDE AND OXIDES OF CARBON
George T. Kerr, Lawrence Township, Mercer County, and Phillip S. Landis, Woodbury, N.J., assignors to Mobil Oil Corporation, a corporation of New York
No Drawing. Filed Dec. 6, 1963, Ser. No. 328,513
16 Claims. (Cl. 23—206)

ABSTRACT OF THE DISCLOSURE

A process for producing carbon disulfide and oxides of carbon which comprises reacting an aliphatic hydrocarbon, e.g., propane, an oxidizing gas, e.g. oxygen, and hydrogen sulfide, at temperatures from about 100° to about 700° C. in the presence of a catalyst comprising an aluminosilicate containing active cation sites within an ordered internal structure having a defined pore size of from about 4 A. to about 15 A. in diameter.

---

This invention relates to the oxidation of hydrocarbons in the presence of an aluminosilicate having unique activity, and in particular to a process for oxidizing aliphatic hydrocarbons in the presence of hydrogen sulfide and an aluminosilicate catalyst.

This invention contemplates oxidation of aliphatic hydrocarbons in the presence of hydrogen sulfide and a catalyst prepared from naturally occurring or synthetic aluminosilicates having active cation sites within an ordered internal structure. These cation sites are formed by the presence of certain exchangeable metal and/or hydrogen cations ionically bonded or chemisorbed within the ordered internal structure of the aluminosilicate; preferably, the cations are those which form complexes with sulfur within the ordered internal structure of the aluminosilicate.

In addition, this invention is concerned with a process for effecting reaction of an aliphatic hydrocarbon, an oxidizing gas, and hydrogen sulfide in the presence of the aforementioned aluminosilicate catalysts.

Also, this invention is directed to the production of carbon disulfide and oxides of carbon by effecting reaction of an aliphatic hydrocarbon, oxygen, and hydrogen sulfide in the presence of the heretofore described aluminosilicate catalysts. Furthermore, this invention contemplates production of certain sulfur containing intermediate compounds in the presence of such aluminosilicate catalysts.

In accordance with this invention, it has been found that aliphatic hydrocarbons can be reacted with an oxidizing gas and hydrogen sulfide to form carbon disulfide and oxides of carbon in the presence of an aluminosilicate catalyst having exchangeable metal and/or hydrogen cations within its ordered internal structure. These exchangeable cations may be present within the catalyst by base exchanging the cations of synthetic or naturally occurring aluminosilicates, by incorporating the cations in the formation of synthetic aluminosilicates or by being an integral portion of a naturally occurring aluminosilicate. In general, the unique activity of the aluminosilicate catalyst for effecting the reaction of the aliphatic hydrocarbons is dependent upon the nature and the concentration of its active cation sites as well as the availability of these sites for contact with the reactants.

The aliphatic hydrocarbons which may be reacted by the process of this invention include saturated and unsaturated hydrocarbons having linear or branched chain configurations. In general, these hydrocarbons may contain from 1 to 20 carbon atoms per molecule and preferably contain from 1 to 10 carbon atoms. Exemplary of some of these hydrocarbons are methane, ethane, n-propane, isopropane, n-butane, isobutane, pentane, n-octane, ethylene, propylene, butylene, amylene and the like. Mixtures of the aforenoted hydrocarbons, such as those found in natural gas are also contemplated as suitable hydrocarbon charge stocks. It will be appreciated that the choice of the hydrocarbon reactant will be dependent upon the specific catalyst as well as the operating conditions and other reactants employed by the process.

The oxidizing gas usually employed in the present process is air. Although in certain instances where the presence of nitrogen and other such inert diluents prove undesirable, it may be necessary to use substantially pure oxygen. In general, the presence of inert diluents such as nitrogen, helium and the like, does not interfere with the present process. It will be appreciated that these diluent streams often serve to maintain high operating pressures or to facilitate dissipation of the heat of reaction from the catalyst bed. In addition, it is contemplated that nitrogen oxides or sulfur dioxide may, in some instances, be used in place of or in combination with oxygen or air.

Hydrogen sulfide may be introduced into the present process as a substantially pure gas or in a gaseous mixture containing inert diluents or reactable hydrocarbons. For example, gases produced in the manufacture of coke oven gas or fuel gas as well as other by-product streams resulting from industrial hydrocarbon processes that contain carbon dioxide, carbon monoxide, water vapor and in some cases paraffinic and olefinic hydrocarbons, may be used.

In general, these reactants are metered into the top of the reactor and intimately mixed so as to begin reaction at the upper portion of the catalyst bed. However, it will be appreciated that the reaction between the hydrogen sulfide and oxygen may be promoted so as to minimize the formation of $CO_2$, by introducing the hydrocarbons into the catalyst at a level below that at which the reaction of hydrogen sulfide and oxygen is taking place.

In accordance with this invention, several aluminosilicates may be employed as catalysts to promote the formation of carbon disulfide and oxides of carbon as described above. Particularly effective catalysts are prepared from those aluminosilicates containing metal cations which form complexes with sulfur such as the alkali metal and alkaline earth metal (e.g., sodium, lithium, calcium, potassium, and the like) forms of the synthetic and naturally occurring aluminosilicates. These aluminosilicates include the "A" zeolites, the faujasites such as zeolites X and Y, and several naturally occurring aluminosilicates such as mordenite, which aluminosilicates are hereinafter described in greater detail. Often these catalysts are prepared from the sodium form of a synthetic aluminosilicate, while in other cases the sodium cations may be replaced by other alkali metal or alkaline earth metal cations by conventional methods of base exchange.

In addition, other effective catalysts may be prepared from aluminosilicates that contain a high concentration of hydrogen sites within an ordered internal structure. These hydrogen sites are produced by ionically bonding or chemisorbing hydrogen cations within the molecular structure of the aluminosilicate. Such bonding or chemisorption may be effected by base exchange of the aluminosilicate (either a naturally occurring or synthetic form) with a fluid medium containing hydrogen ions and/or certain metal cations; the resulting exchanged product thus acquiring an acid character.

Advantageously, the aluminosilicate catalysts having a high concentration of hydrogen sites may be prepared from a variety of naturally occurring and synthetic aluminosilicates. These aluminosilicates have exchangeable alkali metals and alkaline earth metal cations (e.g., alkali metals and alkaline earth metals) that may be completely or partially replaced by conventional base exchange with certain other metal cations and/or hydrogen cations.

Some aluminosilicates can be base exchanged directly with hydrogen cations to form the acid catalysts for this invention; however, other aluminosilicates such as zeolite X, a synthetic faujasite, are not suitable to direct base exchange with hydrogen cations, or are not structurally or thermally stable after a portion of their exchangeable metal cations have been replaced with hydrogen cations. Thus, it is often necessary to exchange other metal cations with these aluminosilicates to achieve the necessary stability within the ordered internal structure prior to the inclusion of the hydrogen cations.

The stability and the distribution of active cation sites formed within an aluminosilicate is also affected by the silicon to aluminum atomic ratio within the ordered internal structure. In an isomorphic series of crystalline aluminosilicate, the substitution of silicon for aluminum in the rigid framework of the lattice results in a decrease of total cation sites as evidenced by elemental analysis and reduction of exchange capacity. Thus, among the faujasite isomorphs, the zeolite known as "Y" will have a sparser distribution of sites within the pores than the zeolite known as "X." It has been found that aluminosilicates having a high silicon to aluminum atomic ratio are more desirable for preparing the catalyst of this invention, preferably the silicon to aluminum atomic ratio is at least 1.8. These catalysts are readily treated by contacting with solutions which contain hydrogen ions and/or metal cations, and are readily regenerable after having been used, by contact at elevated temperatures with an oxygen containing stream under controlled conditions such that the carbonaceous residues may be efficiently removed without damage to the essential structure and properties of the catalyst.

It has been determined that the aluminosilicates having at least 0.5 milliequivalent of hydrogen per gram of solid and preferably above about 0.75 milliequivalent of hydrogen per gram of solid provide effective acid catalysts for the purposes of this invention It will be understood that this value indicates the total concentration of hydrogen cations present within an aluminosilicate and that the spatial concentration of these cations is dependent on the ordered internal structure of the specific aluminosilicate being treated.

Because the unique activity of the aluminosilicate catalyst for effecting the present reactions is dependent on the availability of the active cation sites as well as the nature of the sites, the defined pore size of the aluminosilicate is to be considered when preparing the catalyst of this invention. In general, the aluminosilicate should have a pore size of such dimensions that it can accept the branched chain reactants within its ordered internal structure and also allow formation of polysulfide complexes at the cation sites. It will be appreciated that in certain instances aluminosilicates having small pore sizes provide effective catalysts for the present process because of the orientation of their particular ordered internal structure. Preferably, the pore size is from about 4 A. to about 15 A. in diameter. It will be appreciated that the pore size selected for the aluminosilicate catalyst will depend on the reactants to be employed as well as the configuration of the reaction products that are to be produced.

It will be appreciated that in some instances the aluminosilicates may be exchanged with polyvalent cations which are capable of forming complexes with the sulfur and also producing a relatively high concentration of hydrogen sites within the ordered internal structure of the aluminosilicate. Exemplary of these cations are those metals found in Groups I, II, III and VIII of the Periodic Table (e.g., iron, zinc, nickel, cadmium, and the like).

Typical of the aluminosilicates employed in accordance with this invention, are several aluminosilicates, both natural and synthetic, which have a defined pore size of from 4 A. to 15 A. within an ordered internal structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2:yH_2O$$

wherein M is a cation which balances the electrovalence of the aluminum-containing tetrahedra, $n$ represents the valence of the cation, $w$ the moles of $SiO_2$, and $y$ the moles of $H_2O$. The cation can be any one or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline aluminosilicates utilized by the present invention is the synthetic faujasite designated as zeolite X, and is represented in terms of mole ratios of oxides as follows:

$$1.0 \pm 0.2 M_{2/n}O:Al_2O_3:2.5 \pm 0.5 SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other aluminosilicates are contemplated as also being effective catalytic materials for the invention. Of these other aluminosilicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O:Al_2O_3:wSiO_2:xH_2O$$

wherein $w$ is a value greater than 3 up to about 5 and $x$ may be a value up to about 9.

The selectivity of zeolite Y for larger molecules is appreciably the same as zeolite X because its pore size extends from 10 A. to 13 A.

Another synthesized crystalline aluminosilicate, designated as zeolite A, has been found to be effective for the purposes of this invention. This zeolite may be represented in mole ratios of oxides as:

$$1.0 \pm 0.2 M_{2/n}O:Al_2O_3:1.85 \pm 0.5 SiO_2:yH_2O$$

wherein M represents a metal, $n$ is the valence of M, and $y$ is any value up to about 6.

The sodium form of this zeolite may be represented by the following formula:

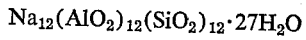

$$Na_{12}(AlO_2)_{12}(SiO_2)_{12} \cdot 27H_2O$$

This material often designated as a "4A" zeolite, has a pore size of about 4 A. in diameter. When about 40% of the sodium cations have been replaced with calcium by conventional exchange techniques, the resulting zeolite is designated as a "5A" zeolite and has a defined pore size of about 5 A. in diameter.

Another aluminosilicate material found to be active in the present process is a naturally occurring zeolite known as mordenite. This zeolite has an ordered crystalline structure having a ratio of silicon atoms to aluminum atoms of about 5 to 1. In its natural state it usually appears as a salt which may be represented by the following formula:

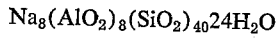

$$Na_8(AlO_2)_8(SiO_2)_{40} 24H_2O$$

Mordenite has an ordered crystalline structure made up of chains of 5-membered rings of tetrahedra. The crystal has a system of parallel channels having free diameters larger than 6.5 A., interconnected by smaller channels, parallel to another axis, on the order of 2.8 A. free diameters. As a result of this different crystalline framework, mordenite in proper ionic forms, sorbs benzene and cyclic hydrocarbons. However, it cannot accept some of the larger molecules which will be sorbed by zeolite X and zeolite Y.

It will be appreciated that other aluminosilicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the aluminosilicate advantageously should have ordered internal structure capable of chemisorbing or ionically bonding additional metals and/or hydrogen ions within its pore structure so that its catalytic activity may be altered for a particular reaction. Among the naturally occurring crystalline aluminosilicates which can be employed are faujasite, heulandite, clinoptilolite, chabazite, gmelinite, mordenite and dachiardite.

One of the preferred aluminosilicate catalysts for the process of this invention is prepared from the sodium form of zeolite X having a pore size of 13 A. This aluminosilicate is a commercially available zeolite designated as Molecular Sieve 13X. Another catalyst is prepared as a result of a conventional treatment (base exchanging) involving partial or complete replacement of the sodium of zeolite X by contact with a fluid medium containing cations of at least one of the rare earth metals. Any medium which will ionize the cations without affecting the crystalline structure of the zeolite may be employed. After such treatment, the resulting exchanged zeolite product is water washed, dried and dehydrated. The dehydration thereby produces the characteristic system of open pores, passages, or cavities of the crystalline aluminosilicates.

As a result of the above treatment, the rare earth exchanged aluminosilicate is an activated crystalline catalyst material in which the molecular structure has been changed by having metallic rare earth cations and hydrogen cations chemisorbed or ionically bonded thereto.

Thus, it has been found that the rare earth exchanged zeolite X catalyst of this invention may contain from about 0.5 to about 1.0 milliequivalent of hydrogen per gram of solid catalyst. Furthermore, it will be appreciated that the defined pore size of the rare earth exchanged zeolite X may vary from above 6 A., generally from 6 A. to 15 A., and preferably in the approximate range of 10 A. to 13 A. in diameter.

Advantageously, the rare earth cations can be provided from the salt of a single metal or preferably mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen cations to replace the sodium cations from the aluminosilicate. This base exchange may be accomplished by treatment with a fluid medium containing the rare earth salts followed by another containing hydrogen cations or cations capable of conversion to hydrogen cations. Inorganic and organic acids represent the source of hydrogen cations, whereas ammonium compounds are representative of the compounds containing cations capable of conversion to hydrogen cations. It will be appreciated that this fluid medium may contain a hydrogen cation, an ammonium cation, or mixture thereof, and a pH range from about 1 to about 12.

Other effective catalysts for the present process can be prepared from aluminosilicates such as zeolite Y and mordenite. Advantageously, the sodium form of zeolite Y alone may be employed as catalytic material. Also, exchange of rare earth metals for the sodium cations within zeolite Y produces a highly active catalyst in a manner similar to that described for preparation of the rare earth exchanged zeolite X. In addition, because of its high acid stability, zeolite Y may be treated by partially replacing the sodium cations with hydrogen cations. This replacement may be accomplished by treatment with a fluid medium containing a hydrogen ion or an ion capable of conversion to a hydrogen ion (i.e., inorganic acids or ammonium compounds or mixture thereof).

Mordenite may be activated to serve as a catalyst for the instant invention by replacement of the sodium cation with a hydrogen cation. The necessary treatment is essentially the same as that described above for the preparation of acid zeolite Y except that a mineral acid such as HCl is used as a source of hydrogen cations. In general, the mordenite is reduced to a fine powder (approximately passing a 200 mesh sieve and preferably passing 300 and 325 mesh sieves or finer) and then acid treated.

Zeolite 4A also may serve as an effective catalyst. Also, although this zeolite material may be base exchanged with other divalent metal cations in a manner similar to that described for preparation of the rare earth exchanged faujasite, preferably it is used in its calcium form as the 5A zeolite.

It will be appreciated that cations of other metals than the rare earths having mono- and polyvalences may be employed to replace the exchangeable cations from the aluminosilicates to provide effective catalysts for this invention. Exemplary of these metals are zinc, magnesium, tin, cobalt, nickel, silver, and the like. Moreover, other higher valence metals such as zirconium, titanium, vanadium, chromium, manganese, iron, and the like may also be employed. It will be understood that the chemical properties of the metal, i.e., its atomic radius, degree of ionization, hydrolysis constant, and the like, will determine its suitability for exchange with a particular aluminosilicate material. It will also be appreciated that certain divalent metals such as calcium, barium, and magnesium may be used with ammonium chloride or like ammonium compounds to produce active cation sites within the aluminosilicate catalyst by conventional base exchange techniques, the ammonium cations being decomposed to form hydrogen sites by heating the exchanged aluminosilicate to drive off ammonia.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crsytalline aluminosilicate. Such materials may be catalytically inert or may possess an intrinsic catalytic activity or an activity attributable to close association or reaction with the crystalline aluminosilicate. Such materials include by way of example, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz, Ser. No. 147,722, filed Oct. 26, 1961, by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, when the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of $\frac{1}{16}''$ to $\frac{1}{8}''$ size, for example, obtained upon pelleting the aluminosilicate with a suitable binder such as clay. The zeolite X, described hereinabove, may be obtained on a clay-free basis or in the form of pellets in which clay is present as a binder.

An extended range of reaction temperatures may be employed by the present process. Because of the high activity exhibited by the aluminosilicate catalyst, temperatures as low as 100° C. may be employed. In general, the reaction temperature does not exceed about 700° C. The preferred reaction temperatures are from about 300° to about 600° C.

It will be appreciated that the choice of reaction temperature is often determined by the selectivity and unique activity of the aluminosilicate catalyst as well as the reactivity of the hydrocarbon compound to be reacted. Thus, the more reactive aliphatics such as propane and propylene produce quantitative yields of carbon disulfide at temperatures on the order of 170° C. in the presence of a sodium form of faujasite such as zeolite X.

At the upper range of reaction temperatures, degradation of the aliphatic hydrocarbons or the reaction products may often occur. At these temperatures, by-products resulting from such side reactions may promote or cause accumulation of coke-like deposits on the catalyst which tend to reduce the availability of the active sites for contact with the reactants and thereby alter the unique activity of the catalyst at these higher temperatures. Accordingly, it will be appreciated that the reaction temperatures selected for the present process will be determined so as to minimize such side reactions, and that this determination will be influenced by the activity of the catalyst as well as other operating conditions.

Subatmospheric to several atmospheres of pressure may be utilized by the present process. In many instances the pressure is autogenous. Also, the pressure may be held at several atmospheres, i.e., 500 p.s.i.g., to facilitate removal of the reaction products from the catalyst bed.

Stoichiometric proportions may be used in the reactions of the present invention. Usually, however, hydrogen sulfide gas is used in excess of that required by stoichiometric proportions. Thus, the molar ratio between the aliphatic hydrocarbon, the oxidizing gas and hydrogen sulfide, may extend from 1:2:2 to 1:10:10. For example, when operating at temperatures above 650° C., it has been found that an excess of oxygen improved the quantitative yields of carbon disulfide obtained by reacting propane with oxygen and hydrogen sulfide. Often, hydrogen sulfide is used at a molar ratio of about 3 to 5 times greater than that required by the stoichiometry of the reaction.

The amount of catalyst used to effect the reactions of this invention may vary considerably depending on whether the reaction is conducted as a batch-type operation, a continuous, or a semi-continuous process. Generally, during batch-type operation it has been found that the amount of catalyst may extend from about 5 percent by weight to about 30 percent by weight of the hydrocarbon. In continuous or semi-continuous processes where one or more reactor vessels are employed with cyclic regeneration of the catalyst, the amount of catalyst, as measured in terms of the hourly space velocities of the carbon compound may be in the range from about 1,000 to about 100,000 volumes gas/hour/volume of catalyst. It will be understood that the catalysts of this invention may be readily regenerated during the cyclic continuous processes or subsequent to their use in batch-type operation by burning the contaminants off in an air stream at temperatures of about 550° C. for about one to about three hours.

It will be appreciated that the operating conditions employed by the present invention will be dependent upon the specific reaction being effected. Such conditions as temperature, pressure, space velocity, presence of inert carrier gases, and the like, will have important effects on the process. Accordingly, the manner in which these conditions affect the process of this invention may be more readily understood by reference to the following specific examples.

Several of the reactions were carried out in a Vycor tubular reactor having a thermowell extending into a catalyst bed containing from five to twenty grams of aluminosilicate catalyst. The periphery of the reactor was wrapped with resistance wire and insulated with asbestos tape and aluminum foil for providing the heat to the catalyst. A variable transformer was used to regulate the heat input. Also, the lower portion of the reactor was surrounded by a water-cooled jacket for controlling the heat produced by the exothermic reactions. An ice cooled receiver and an air cooled receiver placed in series flow served as a condensing system attached to the bottom of the reactor.

After the catalyst had been raised to an initial reaction temperature (300° to 600° C.) in the reactor, the reactants were passed over the catalyst for extended periods of continuous operation. Because of the exothermic heat produced by the reaction, the temperature of the process was controlled by a water-cooled jacket surrounding the reactor. During each run the product stream was continuously condensed, removed, and portions thereof analyzed by mass spectroscopy.

The yields of carbon disulfide obtained in several of the runs were measured by mass spectroscopy and calculated in the following manner:

$$\frac{\text{Mole percent CS}_2 \text{ obtained}}{\text{Theoretical mole percent } \overline{CS_2}} \times 100 = \text{yield of CS}_2$$

One of the catalysts employed during these runs was prepared from a 13X zeolite (the sodium form of zeolite X having a pore size of 13 A.). Another was produced by exchanging this material with cations of the rare earth metals, followed by washing, drying, and calcining in the manner heretofore described. Also, catalysts were prepared from a hydrogen exchanged mordenite, and a 5A zeolite.

*Example I*

Five grams of a 13X zeolite were placed in a tubular reactor and heated to a temperature of from about 300° to about 400° C. Then a gaseous mixture containing 7.3 mole percent of propylene, 25.8 mole percent of oxygen and 67.0 mole percent of hydrogen sulfide was introduced into the catalyst at a rate of 36 liters per hour. Analysis of the resulting product stream showed that it contained the following compounds.

Products: Mole percent
Carbon disulfide _____ 7.5
Carbon dioxide _____ 12.3
Carbon monoxide _____ 7.5
Propylene _____ 3.3
Hydrogen sulfide _____ 67.2
Oxygen _____ 2.2

*Example II*

Following the same procedure and using five grams of a 13X catalyst, a gaseous feed containing 17.8 mole percent propylene, 40 mole percent oxygen, and 42 mole percent of hydrogen sulfide at 51 liters per hour was passed over the catalyst to yield a product having the following composition.

Products: Mole percent
Carbon disulfide _____ 8.1
Carbon dioxide _____ 28.8
Carbon monoxide _____ 10.0
Propylene _____ 12.0
Hydrogen sulfide _____ 31.8
Oxygen _____ 9.4

*Example III*

Using a 13X zeolite catalyst, a reaction mixture containing one part propane, six parts of hydrogen sulfide, and five parts of oxygen (in an air stream) was passed over the catalyst at a temperature of 410° C. at a rate of about 30 liters per hour. After 30 minutes, a yield of 11 percent carbon disulfide was obtained.

*Example IV*

Five grams of a 13X catalyst in a Vycor tubular reactor were heated to a temperature greater than 650° C. Then a mixture containing propane, hydrogen sulfide and oxygen at a molar ratio of 1:6:5 was introduced into the reactor at a rate of about 30 liters per hour. After 30 minutes on stream, analysis of the reaction products by mass spectroscopy showed a yield of 4 percent carbon disulfide.

*Example V*

Following the same procedure employed in Example IV, a gaseous mixture of propane, hydrogen sulfide and oxygen containing an increased proportion of oxygen (a molar ratio of 1:6:10) was passed through a 13X zeolite catalyst at a temperature above 650° C., and a rate of 30 liters per hour. Analysis of the reaction products by mass spectroscopy showed that the yield of carbon disulfide increased to 11 percent.

*Example VI*

A gaseous mixture of propylene, hydrogen sulfide and oxygen (molar ratio of 2:12:9) at a rate of about 50 liters per hour, was passed over a 13X catalyst at a temperature of 170° C. Analysis of the reaction products showed that the yield of carbon disulfide was 12 percent.

*Example VII*

This run employed the same catalyst and reactants as in Example VI, except that the temperature was raised to a temperature greater than 650° C. In this case, the yield was found to be 4 percent thus indicating that operation at higher temperatures may reduce the production of the carbon disulfide, all other variables remaining constant.

*Example VIII*

Using the same procedure and those reactants described in Example VI (propylene, oxygen and hydrogen sulfide) additional runs are conducted in the presence of catalysts prepared from a rare earth exchanged 13X zeolite, an acid-exchanged mordenite and a 5A zeolite. As shown by the following data, good yields of carbon disulfide are produced during each run.

| Catalyst | Molar Ratio C₃H₆/H₂S/O₂ | Vapor Space¹ Velocity | Temp., °C. | Percent Yield CS₂ |
| --- | --- | --- | --- | --- |
| Rare earth exchanged 13 | 1/6/10 | 10,000 | 400 | 14 |
| Acid Mordenite | 1/6/10 | 10,000 | 400 | 19 |
| 5A zeolite | 1/6/10 | 10,000 | 400 | 16 |

¹ Vapor Space Velocity=ml. gas/ml. catalyst/hour.

It will also be appreciated that the examples set forth above, as well as the foregoing specification, are merely illustrative of the different hydrocarbons that may be reacted in accordance with the present process and that other hydrocarbons may be employed in the presence of the aluminosilicate catalysts contemplated by this invention.

It will further be appreciated that the aluminosilicates having active cation sites other than those used in the examples may be employed as catalysts for this process and that various modifications and alterations may be made in the process without departing from the spirit of the invention.

What is claimed is:

1. A process for producing carbon disulfide and oxides of carbon which comprises effecting reaction of an aliphatic hydrocarbon selected from the group consisting of saturated and unsaturated hydrocarbons containing from 1 to 20 carbon atoms, an oxidizing gas selected from the group consisting of air, oxygen, nitrogen oxides, sulfur dioxide, and mixtures thereof, and hydrogen sulfide at temperatures of about 100° to about 700° C. in the presence of a catalyst comprising an aluminosilicate having an ordered internal structure with a defined pore size of from about 4 A. to about 15 A. in diameter and being selected from the group consisting of alkali and alkaline earth metal forms, the rare earth exchanged form, the hydrogen exchanged form and the ammonium exchanged form of the aluminosilicate.

2. The process of claim 1 wherein said oxidizing gas is air.

3. The process of claim 1 wherein said oxidizing gas is sulfur dioxide.

4. The process of claim 1 in which the aluminosilicate has a silicon to aluminum ratio of at least 1.8 within an ordered internal structure.

5. The process of claim 1 in which said aluminosilicate catalyst is faujasite.

6. The process of claim 1 in which said aluminosilicate catalyst is a rare earth exchanged faujasite.

7. The process of claim 1 in which said aluminosilicate catalyst is hydrogen exchanged zeolite Y.

8. The process of claim 1 in which said aluminosilicate catalyst is hydrogen exchanged mordenite.

9. The process of claim 1 in which said aluminosilicate catalyst is a 5A zeolite.

10. The process of claim 1 in which said aluminosilicate catalyst is supported within a porous matrix binder.

11. The process of claim 1 in which the molar ratio of the aliphatic hydrocarbon, the oxidizing gas and hydrogen sulfide extends from about 1:2:2 to about 1:10:10.

12. A process for producing carbon disulfide and oxides of carbon which comprises effecting reaction of propylene, oxygen, and hydrogen sulfide, in the presence of a sodium form of faujasite at a temperature of from about 100° to about 700° C., and recovering a product containing carbon disulfide and oxides of carbon.

13. A process for producing carbon disulfide and oxides of carbon which comprises effecting reaction of propane, oxygen, and hydrogen sulfide, in the presence of sodium form of faujasite at a temperature of from about 300° to about 700° C., and recovering a product containing carbon disulfide and oxides of carbon.

14. A process for producing carbon disulfide and oxides of carbon which comprises effecting reaction of propylene, oxygen, and hydrogen sulfide, in the presence of a rare earth exchanged faujasite at a temperature of from about 200° to about 500° C., and recovering a product containing carbon disulfide and oxides of carbon.

15. A process for producing carbon disulfide and oxides of carbon which comprises effecting reaction of propylene, oxygen, and hydrogen sulfide, in the presence of an acid mordenite at a temperature of from about 200° to about 500° C., and recovering a product containing carbon disulfide and oxides of carbon.

16. A process for producing carbon disulfide and oxides of carbon which comprises effecting reaction of propylene, oxygen, and hydrogen sulfide, in the presence of a 5A zeolite at a temperature of from about 300° to about 600° C., and recovering a product containing carbon disulfide and oxides of carbon.

References Cited

UNITED STATES PATENTS

| | | | |
| --- | --- | --- | --- |
| 2,663,622 | 12/1953 | Odell et al. | 23—206 |
| 2,983,580 | 5/1961 | Kerr | 23—206 X |
| 3,181,928 | 5/1965 | Frilette et al. | |
| 3,227,660 | 1/1966 | Hansford | 23—113 |

FOREIGN PATENTS 671,100  9/1963  Canada.

OTHER REFERENCES

Jacobson: Encyclopedia of Chemical Reactions, vol. 7, p. 100, reaction No. 414, 1958.

OSCAR R. VERTIZ, *Primary Examiner.*

J. J. BROWN, G. T. OZAKI, *Assistant Examiners.*